United States Patent [19]

Beyersdorf et al.

[11] Patent Number: 4,863,979

[45] Date of Patent: Sep. 5, 1989

[54] LATEX COMPOSITIONS USEFUL AS BINDERS IN COMPOSITE BOARD HAVING DIMENSIONAL STABILITY AND STRENGTH

[75] Inventors: Robert S. Beyersdorf; William H. Keskey, both of Midland, Mich.

[73] Assignee: The Dow Chemical Company, Midland, Mich.

[21] Appl. No.: 205,037

[22] Filed: Jun. 10, 1988

Related U.S. Application Data

[63] Continuation-in-part of Ser. No. 928,237, Nov. 7, 1986, abandoned.

[51] Int. Cl.[4] ........................... C08L 9/00; D04H 1/58
[52] U.S. Cl. ........................................ 524/14; 524/401; 524/445; 524/492; 428/288; 428/290; 428/454
[58] Field of Search ................ 524/14, 492, 401, 445; 526/319, 326, 328.5, 329, 329.2; 523/201; 428/532, 688, 288, 290, 454

[56] References Cited

U.S. PATENT DOCUMENTS

| | | | |
|---|---|---|---|
| Re. 28,957 | 9/1976 | Drelich et al. | 428/290 |
| 3,955,031 | 5/1976 | Jones et al. | 428/288 |
| 4,065,423 | 12/1977 | Hen | 524/822 |
| 4,379,808 | 4/1983 | Cole et al. | 428/326 |
| 4,433,020 | 2/1984 | Narukawa et al. | 428/288 |
| 4,472,478 | 9/1984 | Briggs et al. | 428/288 |
| 4,476,175 | 10/1984 | Forry et al. | 428/288 |
| 4,587,278 | 5/1986 | Dotzauer et al. | 523/200 |

*Primary Examiner*—Morton Foelak
*Assistant Examiner*—Nathan M. Nutter

[57] ABSTRACT

Polymeric latexes with a relatively high $T_g$ such as: styrene, butadiene and acrylic acid; or methyl methacrylate, ethyl acrylate and fumaric acid can be used in whole or in part as a binder to produce strong composite board that will not sag substantially under conditions of high temperature and humidity.

22 Claims, No Drawings

LATEX COMPOSITIONS USEFUL AS BINDERS IN COMPOSITE BOARD HAVING DIMENSIONAL STABILITY AND STRENGTH

CROSS-REFERENCE TO RELATED APPLICATION

This is a continuation in part, of application Ser. No. 928,237 Filed Nov. 7, 1986 now abandoned.

BACKGROUND OF THE INVENTION

This invention relates to a latex composition useful as a binder for composite boards containing inorganic and cellulosic materials.

Starch is well known in the art as a binder for composite boards such as ceiling tile. However, under certain environmental conditions, like increased temperature and humidity, the boards lose dimensional stability, e.g., ceiling tile with starch binder sags. At the same time, the board is also required to have adequate strength, e.g., good modulus of rupture, to withstand normal handling and use.

Accordingly, it would be desirable to develop a binder composition to serve as a partial or complete replacement for starch which produces a composite board having adequate strength and dimensional stability with increased temperature and humidity.

SUMMARY OF THE INVENTION

The present invention is such as latex composition. The binder comprises a latex of a copolymer, the copolymer having a glass transition temperature ($T_g$) such that the resulting composite board has sufficient strength for necessary handling and use and maintains dimensional stability with increased temperature and humidity.

DETAILED DESCRIPTION OF THE INVENTION

What is meant by "dimensional stability" is a lack of movement of the composite board when exposed to increased temperature and humidity. Dimensional stability can be measured by evaluating sag resistance of the composite board. Sag resistance is determined by exposing about a 1½×6-inch strip of composite board of the composition as described in Example 1 to 94° F., 90 percent relative humidity for 96 hours, holding 330 g of weight and then measuring the displacement of the center of the board in millimeters (mm). Preferably, the composite board will sag 1.0 mm or less, more preferably less than 0.8 mm and most preferably less than 0.5 mm.

What is meant by "strength" is that the resulting composite board of the composition has the integrity necessary to withstand handling, processing and other forces that are applied to the composite board. The necessary strength can then be determined by preparing a board by the procedures and of the composition as described in Example 1. The resulting composite board with strength has a modulus of rupture (MOR) of at least 130 psi as measured by ASTM 367-78. More preferably, the calculated MOR of the resulting composite board will be at least about 140 psi. The most preferred MOR will be at least about 150 psi.

MOR is calculated from the standard 3 point breaking loading test described in ASTM 367-78 as follows:

Modulus of Rupture (MOR)=$3 PL/bd^2$ where:
P=peak force required to break the sample (1b)
L=span between the sample supports (in)
b=width of the sample (in)
d=thickness of the sample.

This modulus of rupture is corrected for density variation as shown:

MOR corrected =(MOR) $D^2$
where D is the density correction
D=desired density/actual density The glass transition temperature of thee copolymer of latex of the present invention is defined functionally such that the $T_g$ is sufficient when the resulting composite board maintains dimensional stability when exposed to specific environmental conditions and the resulting composite board has a modulus of rupture of at least about 130 psi as measured by ASTM 367-78. The preferred $T_g$ of the latex polymer is at least about 80° C. The more preferred $T_g$ is from about 85° C. to about 120° C. and the most preferred $T_g$ is from about 85° C. to about 110° C.

The latex copolymer composition of this invention can be prepared by a conventional emulsion polymerization process in aqueous medium with conventional additives. Typically, the aqueous phase will contain from about 0.5 to about 5 weight percent (based on the monomer charge) of conventional nonionic or anionic emulsifiers (e.g., potassium, N-dodecyl sulfonate, sodium isooctobenzene sulfonate, sodium laurate, nonyl phenol ethers of polyethylene glycols and the like).

Conventional emulsion polymerization catalysts can be employed in the foregoing latex polymerization and common examples thereof included peroxides, persulfates, azo compounds and the like such as sodium persulfate, potassium persulfate, ammonium persulfate, hydrogen peroxide, azodiisobutyric diamide as well as catalysts (e.g., redox catalysts) which are activated in the water phase (e.g., by a water-soluble reducing agent). The type and amount of catalyst, as well as the particular polymerization conditions employed, will typically depend on the other monomers which are used and polymerization conditions will be generally selected to favor the polymerization of such other monomers. Typically, such catalysts are employed in a catalystic amount, e.g., ranging from 0.01 to about 5 weight percent based upon the monomer weight. In general, the polymerization is conducted at a temperature in the range of from about −10° to about 110° C. (preferably from about 50° to 90° C.).

Similarly, conventional chain transfer agents such as, for example, n-dodecyl mercaptan, bromoform, carbon tetrachloride and the like can also be employed in the normal fashion in polymerization to regulate the molecular weight of the polymer formed therein, and, typically, when such chain transfer agents are used, they are employed in amounts ranging from 0.01 to about 10 (preferably from about 0.1 to about 5) weight percent base upon the weight of the monomers employed in the polymerization. The amount of chain transfer agent employed depends somewhat on the particular transfer agent employed and the particular monomers being polymerized.

Similarly, conventional crosslinking agents, which can be a di-, tri- or tetra-vinyl compound and the like, can also be employed in the normal fashion in polymerization to regulate the $T_g$ and the molecular weight of the polymer former therein. Representative examples of a crosslinking agent are a divinylbenzene, allyl methacrylate or a mono-, di-, tri- or tetra-ethylene glycol diacrylate or dimethacrylate. Typically, when such crosslinking agents are used, they are employed in amounts ranging from about 0.01 to about 4.0 (preferably from about 0.1 to about 1.0) weight percent based upon the weight of the monomers employed in the polymerization. The amount of crosslinking agent employed depends on the monomers being polymerized.

Particularly, the latex composition with a sufficient $T_g$ can be prepared with a combination of hard monomer and soft monomer. An $\alpha,\beta$-ethylenically unsaturated carboxylic acid may also be incorporated.

The term "hard monomer" is meant to include a monomer which homopolymer has a $T_g$ of at least about 80° C. and by the term "soft monomer" is meant a monomer which homopolymer has a $T_g$ less than about 35° C. Typically hard monomers are those conventionally known in the art, for example styrene and methyl methacrylate. Soft monomers are also conventionally known in the art and can be, for example, butadiene, ethyl acrylate or butyl acrylate.

$\alpha,\beta$-ethylenically unsaturated carboxylic acids include compositions of the formula:

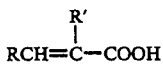

where R is H and R' is H, $C_1$–$C_4$ alkyl, or —$CH_2COOX$;
R is —COOX and R' is H or —$CH_2COOX$; or,
R is $CH_3$ and R' is H; and
X is H or $C_1$–$C_4$ alkyl.

Suitable $\alpha,\beta$-ethylenically unsaturated aliphatic carboxylic acids are monoethylenically unsaturated monocarboxylic, dicarboxylic and tricarboxylic acids having the ethylenic unsaturation alpha-beta to at least one of the carboxyl groups and similar monomers having a higher number of carboxyl groups. It is understood that the carboxyl groups may be present in the acid or salt form (—COOM in which M represents hydrogen or a metal, such as for example, sodium or potassium) and are readily interconvertible by well known simple procedures.

Specific examples of the $\alpha,\beta$-ethylenically unsaturated aliphatic carboxylic acids are acrylic acid, methacrylic acid, fumaric acid, itaconic acid, maleic acid, aconitic acid, various $\alpha$-substituted acrylic acids such as $\alpha$-ethacrylic acid, $\alpha$-propyl acrylic acid and $\alpha$-butyl acrylic acid.

The latex composition will typically include a hard monomer content from about 50 to about 99 weight percent and the soft monomer content will be in an amount from about 1 to about 50 weight percent. The carboxylic acid level may be from about 0 to about 20 weight percent. Preferably, the hard monomer is present in an amount from about 65 to about 95 weight percent, the soft monomer is present in an amount from about 5 to about 35 weight percent and the carboxylic acid is present in an amount more preferably from about 0.5 to about 10 weight percent.

A particular copolymer family suitable for the latex of the present invention is a copolymer comprising a monovinylidene monomer and an aliphatic conjugated diene. Normally, an $\alpha,\beta$-ethylenically unsaturated carboxylic acid termonomer is incorporated into the polymer.

The term "monovinylidene monomer" is intended to include those monomers wherein a radical of the formula:

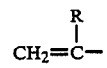

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, $\alpha$-methylstyrene, ortho-,meta- and para-methylstyrene; ortho-, meta- and para-ethystyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnaphthalene; diverse vinyl (alkylnaphthalenes) and vinyl (halonapthalenes) and comonomeric mixtures thereof.

Acyclic aliphatic conjugated dienes usually employed herein include typically those compounds which have from about 4 to about 9 carbon atoms, for example, 1,3-butadiene, 2-methyl-1,3-butadiene; 2,3-dimethyl-1,3-butadiene; and other hydrocarbon analogs of 2,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properies of interpolymers produced therefrom makes 1,3-butadiene the most preferred acyclic aliphatic conjugated diene.

Another family of suitable copolymers is a copolymer of a monovinylidene compound (as defined above) and an ester of an $\alpha,\beta$-ethylenically unsaturated carboxylic acid (as defined below) with a $T_g$ of less than about 25° C. An $\alpha,\beta$-ethylenically unsaturated carboxylic acid termonomer can also be incorporated into the polymer.

Esters of $\alpha,\beta$-ethylenically unsaturated carboxylic acid useful herein as soft monomers include typically soft acrylates (i.e., those with homopolymers having a $T_g$ of less than about 25° C.) such as benzyl acrylate, butyl acrylate, sec-butyl acrylate, cyclohexyl acrylate, dodecyl acrylate, hydroxyethyl acrylate, hydroxypropyl acrylate, ethyl acrylate, 2-ethylbutyl acrylate, 2-ethylhexyl acrylate, heptyl acrylate, hexyl acrylate, isobutyl acrylate, isopropyl acrylate, methyl acrylate, propyl acrylate, etc. and soft methacrylates such as butyl methacrylate, and hexyl methacrylate. The cost, availability and known properties of butyl acrylate, and ethyl acrylate make these monomers preferred among the acrylates.

Still a third family of copolymers useful in the latex of the present invention comprises a copolymer of two or more esters of ethylenically unsaturated carboxylic acids, one of which has a homopolymer with a $T_g$ less than about 25° C. and the other of which has a homopolymer with a $T_g$ of greater than about 80° C., as defined above, such as: methyl methacrylate and ethyl acrylate. The copolymer can also include a termonomer of an $\alpha,\beta$-ethylenically unsaturated carboxylic acid.

Esters of α,β-ethylenically unsaturated carboxylic acids having a homopolymer which $T_g$ is greater than about 80° C. typically include hard methacrylates such a tert-butyl methacrylate, isopropyl methacrylate, methyl methacrylate, etc. The cost, availability and known properties of methyl methacrylate make it preferred among the methacrylates.

Additional monomers (such as those described above) can be added to any of the families of copolymers described above. Additionally monomers which can also be added to any of the families of copolymers are termonomers having homopolymers with an intermediate $T_g$ of greater than about 25° C. but less than 80° C. such as: 4-biphenyl acrylate, tert-butyl acrylate, vinyl acetate, sec-butyl methacrylate, cyclohexyl methacrylate, ethyl methacrylate, isobutyl methacrylate, propyl methacrylate, isobutyl methacrylate, n-propyl methacrylate and tert-butyl amino ethyl methacrylate.

The composite board, e.g. ceiling tiles, can be prepared by any conventional process. Examples are: water-felted formed on a Fourdrinier, water-borne (slurried in water) or cast molded.

The inorganic and cellulosic materials of the composite are conventionally known fillers and fibers. For example, mineral wool (inorganic fiber), perlite or clay (inorganic fillers) and cellulose (cellulosic material).

Typical amounts of the binder are from about 1 to about 25 percent by weight; the cellulosic material, from about 5 to about 50 percent by weight; the inorganic fiber, from about 10 to about 70 percent by weight; and the inorganic filler, from about 5 to about 90 percent by weight, based upon the total weight of the composite board.

The binder system is not limited exclusively to the latex but rather the latex may be all or part of the binder system, e.g. latex plus starch.

Ceiling tile is prepared by dispersing newsprint and mixing the dispersion with inorganic and cellulosic material. Latex then flocculant is added and the resultant furnish is poured into a mold, diluted and drained. The resultant wet mat is then pressed and dried.

The invention is further illustrated, but is not limited by the following examples wherein all parts and percentages are by weight unless otherwise specified.

EXAMPLE 1

Into a 1-liter glass reactor immersed in a temperature controlled water bath are added 359 g of deionized water, 3.0 g of a 1 percent active aqueous pentasodium diethylene triamine pentaacetate solution, and 3.0 g of fumaric acid. heat the reactor to about 60° C. to dissolve the fumaric acid and then add 4.5 g of a 33.2 percent solids seed latex containing polystyrene polymer particles. The reactor is purged with nitrogen and heated to 85° C. and over a 2-hour period period is added a monomer stream containing 270 g of methyl methacrylate and 27 g of ethyl acrylate.

Beginning at the start of the monomer addition is added over a 2 1/6-hour period, an aqueous stream containing 90.0 g deionized water, 1.5 g sodium persulfate, 0.3 g sodium hydroxide and 3.3 g of a 45 percent active surfactant solution. Following the addition of the monomer and aqueous streams, the reactor is maintained at 85° C. for 1 hour, then cooled.

The latex is then incorporated as the binder into ceiling tiles in the following manner:

Printed newsprint is dispersed in water at 2.0 percent solids. A Cowles blade is used with an air stirrer at high rpm to redisperse the cellulose to a Canadian Standard Freeness of 250-300 mls. Water (4,000 ml), clay (6.0 g), perlite (37.5 g), mineral wool (75.0 g), and the dispersed newsprint (825 ml, 16.5 g of fiber) are mixed for three minutes with moderate agitation using a Cowles blade. Latex (15.0 g of polymer) is added and the slurry is mixed for 30 seconds. Flocculant (cationic polyacrylamide) is added until the latex is completely flocculated (determined by the point when the water becomes clear). Flocculation is carried out with less than moderate agitation. The flocculated furnish is poured into a Williams Sheet mold apparatus and is diluted to approximately 2.0 percent solids. The furnish is dispersed and drained don a retaining wire. The wet mat is pressed to a thickness of 630 mils and dried at 375° to 400° F. in a forced air oven. The resulting board is approximately 8.2×8.2 inches, has a thickness of about 0.7 inches and a density of about 12 lbs/ft$^3$.

EXAMPLE 2

Into a 1-liter glass reactor immersed in a temperature controlled water bath are added 359 g of deionized water, 3 g of a 1 percent active aqueous pentasodium diethylenetriamine pentaacetate solution and 5.06 g of a 27 percent solids seed latex containing polystyrene polymer particles. The reactor is purged with nitrogen and heated to 90° C. Then over a 3 hour period is added a monomer stream containing 255 g of styrene, 18 g acrylic acid and 27 g of ethyl acrylate.

Beginning at the start of the monomer addition is also added over a 3¼-hour period, an aqueous stream containing 90 g of deionized water, 1.5 g of sodium persulfate, 0.3 g sodium hydroxide and 3.3 g of a 45 percent active surfactant solution. Following the addition of the monomer and aqueous streams, the reactor is maintained at 90° C. for 30 minutes, then cooled.

A ceiling board is then formulated in the manner described in Example 1.

Ceiling boards are prepared in a like manner from the following latexes:

TABLE I

| Ceiling Board Evaluation | | | | | |
|---|---|---|---|---|---|
| Example | Binder | | $T_g$ | MOR (psi) | Sag (mm) |
| 1 | MMA/EA/FA | 90/9/1 | 106 | 170 | 0.2 |
| 2 | S/EA/AA | 85/9/6 | 104 | 182 | 0.1 |
| 3 | S/BA/AA | 70/24/6 | 71 | 175 | 0.1 |
| 4 | S/EA/FA | 90/9/1 | 98 | 159 | 0.1 |
| 5 | MMA/EA/FA | 80/19/1 | 82 | 151 | 0.5 |
| 6 | MMA/EA/FA | 75/24/1 | 78 | 163 | 0.7 |
| 7 | MMA/BA/FA | 65/34/1 | 57 | 175 | 1.0 |
| 8 | S/B/AA | 88/10/2 | 86 | 150 | 0.3 |
| 9 | S/B/AA | 81/17/2 | 45 | 138 | 1.0 |
| Comparative A | Starch | — | — | 135 | 1.2 |
| Comparative B | S/IA | 99/1 | 106 | 100 | 0.8 |

TABLE II

| Monomer Terms |
|---|
| (S) — styrene |
| (B) — butadiene |
| (MMA) — methyl methacrylate |
| (EA) — ethyl acrylate |
| (BA) — butyl acrylate |
| (AA) — acrylic acid |
| (IA) — itaconic acid |
| (FA) — fumaric acid |

The table above indicates starch containing ceiling tile (Comparative A) has a high MOR (high strength) but little sag resistance. The polystyrene latex binder containing ceiling tile (Comparative B) has moderate sag resistance but a low MOR (little strength).

The latex binders of the invention have both excellent strength (high MOR) and little sag, i.e,. an MOR of at least 130 psi and a sag of 1 mm or less. Example 3, a copolymer of styrene, butyl acrylate and acrylic acid (70/24/6), is illustrative of the combination of high binder strength—an MOR of 175 psi and high sag resistance—1.0mm sag.

An entirely different copolymer, Example 1, methyl methacrylate, ethyl acrylate and fumaric acid (90/9/1) also shows high binder strength—MOR of 170 psi—and a high sag resistance—0.2 mm sag.

What is claimed is:

1. A composite board comprising inorganic or cellulosic materials or both inorganic and cellulosic materials and a latex binder, the latex binder comprising a copolymer having a $T_{g\ of\ at\ least\ about}$ 80° C., wherein the resulting composite board has a modulus of rupture of at least about 130 psi as measured by ASTM 367-78 whereby, upon exposing a 1½×6 inch strip of the composite board to 90 percent relative humidity at 94° F. for 96 hours, the composite board sags less than 0.8 mm.

2. The composite board of claim 1, wherein the latex binder comprises a monovinylidene monomer, an aliphatic conjugated diene monomer and an α-β-ethylenically unsaturated carboxylic acid.

3. The composite board of claim 1, wherein the latex binder comprises methyl methacrylate, ethyl acrylate and fumaric acid.

4. The composite board of claim 1, wherein the latex binder comprises a copolymer of styrene and butadiene.

5. The composite board of claim 1, wherein the latex binder comprises a copolymer of styrene and one or more esters of ethylenically unsaturated carboxylic acid selected from the group consisting of methyl methacrylate, ethyl acrylate and butyl acrylate.

6. The composite board of claim 1, wherein the latex binder comprises a polymer of styrene, ethyl acrylate and acrylic acid.

7. The composite board of claim 1 wherein the copolymer comprises a hard monomer having as a homopolymer a $T_g$ of at least about 80° C. and a soft monomer having as a homopolymer a $T_g$ of less than about 35° C.

8. The composite board of claim 7 wherein the hard monomer is present in an amount of from about 50 to 99 weight percent and the soft monomer is present in an amount of from about 1 to about 50 weight percent.

9. The composite board of claim 1 wherein the modulus of rupture is at least about 140 psi.

10. The composite board of claim 1 wherein the copolymer has a $T_g$ of from about 85° to about 110° C.

11. The composite board of claim 1 wherein the copolymer has a $T_g$ of from about 85° to about 120° C.

12. The composite board of claim 3 wherein the methyl methacrylate is present in an amount from about 50 to about 99 weight percent, the ethyl acrylate is present in an amount of from about 1 to about 50 weight percent and the fumaric acid is present in an amount of from about zero to about 20 weight percent.

13. The composite board to claim 3 wherein the methyl methacrylate is present in an amount of from about 65 to about 95 weight percent, the ethyl acrylate is present in an amount of from about 5 to about 35 weight percent and the fumaric acid is present in an amount from about 0.5 to about 10 weight percent.

14. The composite board of claim 6 wherein the styrene is present in an amount of from about 50 to about 99 weight percent, the ethyl acrylate is present in an amount of from about 1 to about 50 weight percent and the acrylic acid is present in an amount of from about zero to about 20 weight percent.

15. The composite board of claim 6 wherein the styrene is present in an amount of from about 65 to about 95 weight percent, the ethyl acrylate is present in an amount of from about 5 to about 35 weight percent and the acrylic acid is present in an amount of from about 0.5 to about 10 weight percent.

16. The composite board of claim 7 wherein the hard monomer is present in an amount from about 50 to about 99 weight percent and the soft monomer is present in an amount of from about 1 to about 50 weight percent.

17. The composite board of claim 16 wherein the hard monomer is methyl methacrylate and the soft monomer is ethyl acrylate and the latex binder additionally comprises fumaric acid in an amount of from about zero to about 20 weight percent.

18. The composite board·claim 16 wherein the hard monomer is styrene, the soft monomer is ethyl acrylate and the latex binder additionally comprises acrylic acid in an amount of from about zero to about 20 weight percent.

19. The composite board of claim 11 wherein the copolymer comprises methyl methacrylate, ethyl acrylate and fumaric acid.

20. The composite board of claim 11 wherein the copolymer comprises styrene, ethyl acrylate and acrylic acid.

21. The composite board of claim 19 wherein the methyl methacrylate is present in an amount of from about 65 to about 95 weight percent, the ethyl acrylate is present in an amount of from about 5 to about 35 weight percent and the fumaric acid is present in an amount of from about 0.5 to about 10 weight percent.

22. The composite board of claim 20 wherein the styrene is present in an amount of from about 65 to about 95 weight percent, the ethyl acrylate is present in an amount of from about 5 to about 35 weight percent and the acrylic acid is present in an amount of from about 0.5 to about 10 weight percent.

* * * * *

UNITED STATES PATENT AND TRADEMARK OFFICE
CERTIFICATE OF CORRECTION

PATENT NO. : 4,863,979

DATED : September 5, 1989

INVENTOR(S) : Robert S. Beyersdorf and William H. Keskey

It is certified that error appears in the above-identified patent and that said Letters Patent is hereby corrected as shown below:

Column 1, line 31, "as" should read --a--; and at line 59, "procedures" should read --procedure--.

Column 2, line 11, "thee" should read --the--; line 58, "base" should read --based--; and at line 67, "former" should read --formed--.

Column 3, line 17, "Typically" should read --Typical--.

Column 4, line 16, "para-ethystyrene:" should read --para-ethylstyrene--; line 22, "usually" should read --usefully--; and at line 26 after "butadiene;" should read --pentadiene; 2-neopentyl-1, 3-butadiene--.

Column 5, line 4, "a" should read --as--; line 10, "Additionally" should read --Additional--; line 51, "acid. heat" should read --acid. Heat--.

Column 6, line 14, "don" should read --on--.

Column 7, line 21, "of at least about" should be printed in regular type.

Column 8, line 7, "to" should read --of--.

Signed and Sealed this

Nineteenth Day of November, 1991

Attest:

HARRY F. MANBECK, JR.

Attesting Officer

Commissioner of Patents and Trademarks